US012729509B2

(12) United States Patent
Hageman et al.

(10) Patent No.: US 12,729,509 B2
(45) Date of Patent: Sep. 8, 2026

(54) CUSTOMIZED WORK PLANNING FOR AUTOMATED LOADING, UNLOADING, AND TRANSPORT OPERATIONS BY SCRAPER SYSTEMS

(71) Applicant: Deere & Company, Moline, IL (US)

(72) Inventors: John M. Hageman, Dubuque, IA (US); Joshua T. Lawson, Woodbury, MN (US); Francois Stander, Dubuque, IA (US)

(73) Assignee: Deere & Company, Moline, IL (US)

( * ) Notice: Subject to any disclaimer, the term of this patent is extended or adjusted under 35 U.S.C. 154(b) by 354 days.

(21) Appl. No.: 17/963,440

(22) Filed: Oct. 11, 2022

(65) Prior Publication Data

US 2024/0117597 A1 Apr. 11, 2024

(51) Int. Cl.
*E02F 9/20* (2006.01)
*G05D 1/00* (2006.01)

(52) U.S. Cl.
CPC ............ *E02F 9/2045* (2013.01); *E02F 9/205* (2013.01); *E02F 9/2054* (2013.01); *G05D 1/0016* (2013.01); *G05D 1/0217* (2013.01); *G05D 1/0219* (2013.01)

(58) Field of Classification Search
CPC ....... E02F 9/2045; E02F 9/205; E02F 9/2054; E02F 9/262; G05D 1/0016; G05D 1/0217; G05D 1/0219; G05D 2105/15; G05D 2107/21; G05D 2109/10; G05D 1/648; G05D 1/6987
See application file for complete search history.

(56) References Cited

U.S. PATENT DOCUMENTS 5,493,798 A 2/1996 Rocke et al.
6,041,528 A * 3/2000 Broach ................. E02F 3/6481 37/426
6,092,863 A 7/2000 Hagenbuch et al.
6,247,538 B1 6/2001 Takeda et al.
(Continued)

FOREIGN PATENT DOCUMENTS

JP 2022011680 A * 1/2022
WO 2012157381 A1 11/2012

*Primary Examiner* — Kito R Robinson
*Assistant Examiner* — Alexander V Gentile
(74) *Attorney, Agent, or Firm* — Gary L. Montle; Lucian Wayne Beavers; Patterson Intellectual Property Law, PC

(57) ABSTRACT

A system and method are provided for controlling operation of earth working machines, e.g., scraper units configured to load, transport, and unload material depending on the respective work state. A design plan (e.g., a cut-fill map) is obtained corresponding to a working area to which the earth working machines are assigned. For each of the machines, the method further includes generating and/or selectively retrieving performance optimization data sets comprising a loading capacity and loading rates correlated to combinations of input data for working parameters for the respective machine, generating a work plan comprising a route of advance and corresponding work state transitions of the machine with respect to the working area, wherein the work plan is generated based at least in part on the performance optimization data sets and the design plan, and automatically controlling working parameters for the machine in accordance with the generated work plan.

19 Claims, 4 Drawing Sheets

(56) References Cited

U.S. PATENT DOCUMENTS 7,326,023 B2 2/2008 Hagenbuch
7,934,329 B2 5/2011 Mintah et al.
8,752,372 B2 6/2014 Ramler et al.
8,948,974 B2 2/2015 Montocchio
9,074,546 B2 7/2015 Asami et al.
9,187,879 B2 11/2015 Suk
9,221,659 B2 12/2015 Fukasu et al.
9,342,091 B2 5/2016 Wuisan et al.
9,347,389 B2 5/2016 Kawaguchi et al.
9,415,953 B2 8/2016 Bonefas
9,803,324 B2 10/2017 Kean et al.
9,815,479 B2 11/2017 Stander et al.
9,822,509 B1 11/2017 Chi et al.
9,908,385 B2 3/2018 Chundrlik, Jr. et al.
10,133,994 B2 11/2018 Nichols et al.
10,479,354 B2 11/2019 Posselius et al.
10,662,613 B2 5/2020 Ready-Campbell et al.
10,968,602 B2 4/2021 Hendricks
2012/0136524 A1 5/2012 Everett et al.
2017/0200306 A1* 7/2017 Marsolek ................ E02F 9/262
2017/0233955 A1 8/2017 Berning et al.
2018/0035050 A1 2/2018 Lu et al.
2018/0170719 A1 6/2018 Tasch et al.
2018/0179732 A1 6/2018 Bartsch et al.
2020/0042023 A1 2/2020 Garvin et al.
2020/0238881 A1 7/2020 Hendricks
2020/0241561 A1* 7/2020 Hendricks ................. B60P 1/04
2020/0325653 A1* 10/2020 Hageman ................ E02F 9/265
2021/0062470 A1* 3/2021 Wei ......................... E02F 9/264
2021/0149403 A1* 5/2021 Ready-Campbell ......................... G05D 1/0027
2022/0098828 A1 3/2022 Stander

* cited by examiner

CUSTOMIZED WORK PLANNING FOR AUTOMATED LOADING, UNLOADING, AND TRANSPORT OPERATIONS BY SCRAPER SYSTEMS

FIELD OF THE DISCLOSURE

The present disclosure relates generally to scrapers that are integrated with or otherwise driven (i.e., drawn or pushed) by a work vehicle to define a self-propelled earth working machine, and more particularly to systems and methods for generating pre-planned paths and work state transitions for a work cycle associated with the earth working machine and optionally automating one or more functions thereof relating to the work state.

BACKGROUND

Earth working machines as discussed herein may typically include a scraper system (e.g., including a blade for dislodging material to be moved and a receptacle for transportation of the dislodged material) in combination with a tractor, articulated dump truck, or the like, such that the scraper (or equivalent implement) is functionally integrated with a work vehicle, or coupled to and drawn or pushed by a work vehicle, and thereby define a self-propelled earth working machine. However, while a scraper may define a first type of earth working machine for implementing a method as further described herein, the scope of the present disclosure may include other earth working machines and equipment, self-propelled or otherwise, for working the terrain according to a design plan as conventionally known in the art, including but not limited to a cut and fill map for a defined work area.

BRIEF SUMMARY

The current disclosure provides an enhancement to conventional systems, at least in part by introducing a novel system and method for creating and implementing customized work plans for a self-propelled earth working machine including a scraper, which not only provide a route and/or direction of travel but also a planned work cycle and corresponding work states of the earth working machine over time (e.g., loading, unloading, and transporting, with respect for example to specified portions of the route, amount of time spent, or the like).

In one embodiment, a method is disclosed herein for method of controlling operation of one or more earth working machines each including a loading container and an earth working implement, wherein each of the one or more earth working machines is configured in a first work state to control loading of earth being worked by the earth working implement while the machine is advancing into the loading container, in a second work state to disable further loading and to transport the earth working machine with the earth loaded in the loading container, and in a third work state to direct unloading of the loaded earth from the loading container. A design plan is obtained corresponding to a working area to which the one or more earth working machines are assigned. The method further includes, for each of the one or more earth working machines, generating and/or selectively retrieving one or more performance optimization data sets comprising a loading capacity of the loading container and loading rates of the earth working machine correlated to respective combinations of input data for working parameters for the earth working machine, generating a work plan comprising a route of advance and corresponding work state transitions of the earth working machine with respect to the working area, wherein the work plan is generated based at least in part on the one or more performance optimization data sets and the design plan, and automatically controlling one or more working parameters for the earth working machine in accordance with the generated work plan.

In one exemplary aspect according to the above-referenced embodiment, the design plan may be generated from one or more data sets comprising first profile data associated with a current profile of the working area and second profile data associated with a target profile of the working area, wherein the first profile data and the second profile data respectively comprise x, y, and z coordinate data in a reference system external to the one or more earth working machines.

In another exemplary aspect according to the above-referenced embodiment, the first profile data may be updated to account for a determined work output based at least in part on a sensed one or more working parameters for at least one of the one or more earth working machines at least upon transitioning from the first work state to the second work state.

In another exemplary aspect according to the above-referenced embodiment, the updated first profile data may be made selectively available for each of a plurality of the earth working machines associated with the working area, wherein the plurality of earth working machines comprises the one or more earth working machines as a first set of earth working machines and at least one earth working machine of a different type as a second set of earth working machines.

In another exemplary aspect according to the above-referenced embodiment, the respectively generated work plans may be updated for at least the first set of earth working machines based at least in part on the updated first profile data, and automatically controlling one or more working parameters for each of the at least first set of earth working machines in accordance with the respectively updated work plans.

In another exemplary aspect according to the above-referenced embodiment, the method may further include, for each of the one or more earth working machines, determining a plurality of work segments associated with the working area, each of the plurality of work segments corresponding to a predicted amount of earth worked during one iteration of the first work state for the earth working machine based upon at least the one or more performance optimization data sets, wherein the generated work plan comprises a projected sequence of the plurality of work segments to optimize a number of iterations of the first work state required to produce a profile for the working area corresponding to a target profile of the working area.

In another exemplary aspect according to the above-referenced embodiment, each of the plurality of work segments may be assigned to a respective one of a plurality of earth working machines associated with the working area.

In another exemplary aspect according to the above-referenced embodiment, transport times between each of the plurality of work segments and an assigned unloading site may be accounted for in the generated work plan.

In another exemplary aspect according to the above-referenced embodiment, the performance optimization data sets for each of the one or more earth working machines may further comprise data corresponding to one or more material characteristics of the earth to be worked by the respective earth working machine.

In another exemplary aspect according to the above-referenced embodiment, the method may further include, for each of the one or more earth working machines, determining an amount of earth remaining in the loading container after an unloading operation, and selectively adjusting one or more portions of the work plan based at least in part on the determined amount of earth remaining in the loading container.

In another exemplary aspect according to the above-referenced embodiment, a current work state for each of the one or more earth working machines may be determined based on sensed real-time values for one or more working parameters corresponding to an advance speed of the earth working machine, a position of the earth working implement, and a level and/or volume of earth loaded in the loading container.

In another exemplary aspect according to the above-referenced embodiment, the automatically controlled one or more working parameters for each of the one or more earth working machines may comprise one or more working parameters associated with a steering unit and/or earth working implement for the earth working machine.

In another exemplary aspect according to the above-referenced embodiment, at least one variable associated with the work plan for at least one of the one or more earth working machines may be adjustable in real time based on user input received via a user interface functionally linked to a controller for the at least one earth working machine.

In another embodiment, a system as disclosed herein may include one or more earth working machines each including a loading container and an earth working implement, and being configured in a first work state to control loading of earth being worked by the earth working implement while the respective machine is advancing into the loading container, in a second work state to disable further loading and to transport the earth working machine with the earth loaded in the loading container, and in a third work state to direct unloading of the loaded earth from the loading container. A data storage network is provided having stored therein a design plan comprising design data representing a difference between a current profile of a working area and a target profile of the working area, wherein the design data comprise x, y, and z coordinate data in a reference system external to the one or more earth working machines, and, for at least one of the one or more earth working machines, one or more performance optimization data sets comprising a loading capacity of the loading container and loading rates of the earth working machine correlated to respective combinations of input data for working parameters for the earth working machine. One or more computing devices are provided in functional communication with the one or more earth working machines and with the data storage network, wherein the one or more computing devices are configured to, for each of the one or more earth working machines, perform operations according to the above-referenced method embodiment and optionally any of the above-referenced aspects thereof.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-4, various embodiments may now be described of a system and method for customized and predetermined work plans for alerting, control, and/or remote operation according to various work states for a self-propelled earth working machine.

Figure 1:
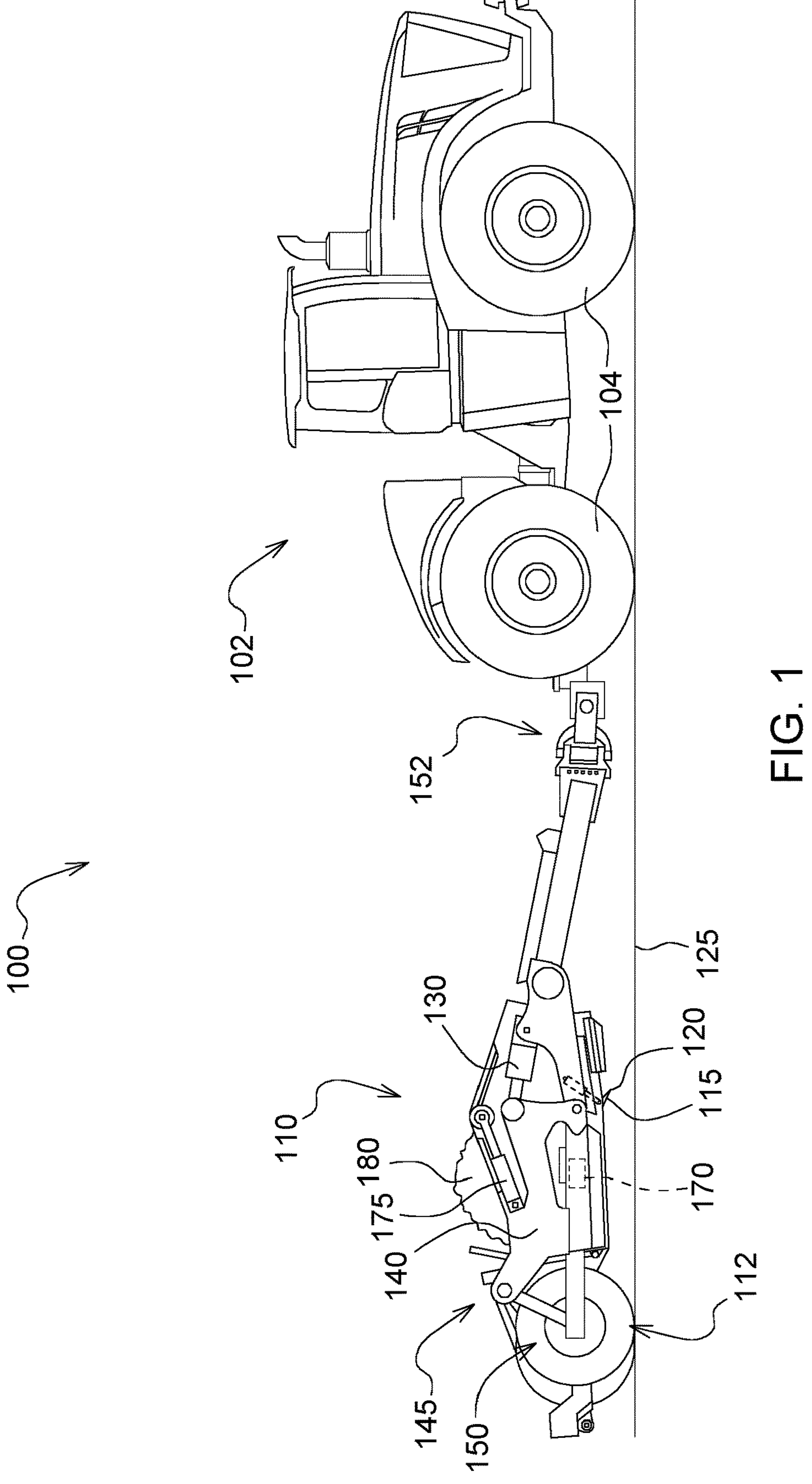
FIG. 1 is a side view representing a work vehicle and a scraper as an exemplary implement in a earth working machine according to the present disclosure.

In an embodiment as disclosed herein, and illustrated by reference to FIG. 1, a self-propelled earth working machine 100 includes an earth working implement 110 in the form of a scraper 110 which may be discretely coupled to a self-propelled work vehicle, such as a tractor 102 for towing the implement 110 using driven ground-engaging wheels or tracks 104. In other embodiments (not shown), the work vehicle may be an articulated dump truck, and/or the implement 110 may be integrated with the work vehicle as opposed to being drawn or pushed thereby, in a manner familiar to those of skill in the art. While the implement 110 as further described below with reference to FIG. 1 will be referenced generally as a scraper 110, other forms of implements may nonetheless fall within the scope of at least some embodiments of the present disclosure unless otherwise specifically noted.

The scraper 110 is adapted to cut (i.e., remove a portion of a ground surface), load, transport, and unload material to another location. A ground-engaging mechanism 112 as shown comprises a pair of wheels and optionally can have more than two wheels. However, it is contemplated that the implement 110 may be propelled or supported by way of wheels, continuous tracks, and/or belts, depending on the embodiment desired. The implement 110 may include a blade 115 having a cutting edge 120 for scraping a ground surface 125 and a blade actuator 130 for adjusting engagement of the blade 115 with the ground surface 125. The implement 110 may include a loading container 140 or equivalent receptacle operatively coupled to the blade 115 with the loading container towed across the ground surface 125 as the ground surface is cut. The loading container 140 may be embodied as a generally hollow enclosure having an opening at a front end. A blade 115 may be located at front end and positioned to selectively engage the ground surface 125 for material removal.

The implement 110 may include multiple components that interact to power and control operations of the loading container 140 and of the blade 115. Specifically, the implement 110 may include a frame 145, a rear axle assembly 150, and an articulating hitch assembly 152. The frame 145 may be coupled to the rear axle assembly 150 and configured to support the loading container 140. The articulating hitch assembly 152 may couple the frame 145 to a tractor 102 as shown for towing the implement 110 while allowing some relative movement in both the vertical and horizontal directions.

The loading container 140 may be coupled to and supported by a rear axle assembly 150. During extension and retraction of loading container actuators 175, also sometimes referred to as gate actuators 175, the loading container 140 may be caused to pivot in the vertical direction about a rear axle assembly 150 such that a lead or front end of the loading container may be raised and lowered relative to the ground surface 125. In some embodiments, a power source 170 may be contained near the loading container 140 and supported by rear axle assembly 150. The power source 170 may be operated to drive rear axle assembly 150 and thereby push or at least assist in advancing the implement 110 across the ground surface 125.

In an embodiment (not shown), an implement 110 may be provided with an ejection system which can selectively eject the payload substantially laterally from the loading container 140 onto the ground surface ahead of the earth working machine 100. The ejection system may be positioned toward the rear of an ejector body, and includes an ejector, which may also be referred to as a headboard, and an actuator. The ejection system operates by having the actuator move the ejector forward to force material 180 out the front end of the loading container 140. The ejector may be supported, aligned, and oriented during this motion by a retention assembly within the loading container 140. The retention assembly may be, for example, a set of guides which receive protrusions from the ejector, and the cooperation of the ejector with these guides may keep the ejector properly aligned and oriented during its movement in the loading container 140. Such an actuator may be a double-acting telescoping hydraulic cylinder, or in alternative embodiments may include a non-telescoping hydraulic cylinder, a hydraulic motor, a screw or worm gear, chains, cables, or an electric motor or actuator, either alone or in combination with each other.

In accordance with an embodiment wherein for example the implement 110 is integrated with a work vehicle 102 such as an ADT, the actuator may be controlled by the flow of hydraulic fluid from an electro-hydraulic valve which receives pressurized hydraulic fluid from a hydraulic pump, which is rotationally coupled to, and powered by, an engine via a transmission. Alternatively, the hydraulic pump may be directly powered by the engine without an intermediate transmission. The engine is disposed on the front frame and powers the earth working machine 100, including providing tractive effort delivered through transmission and ground-engaging wheels.

Figure 2:
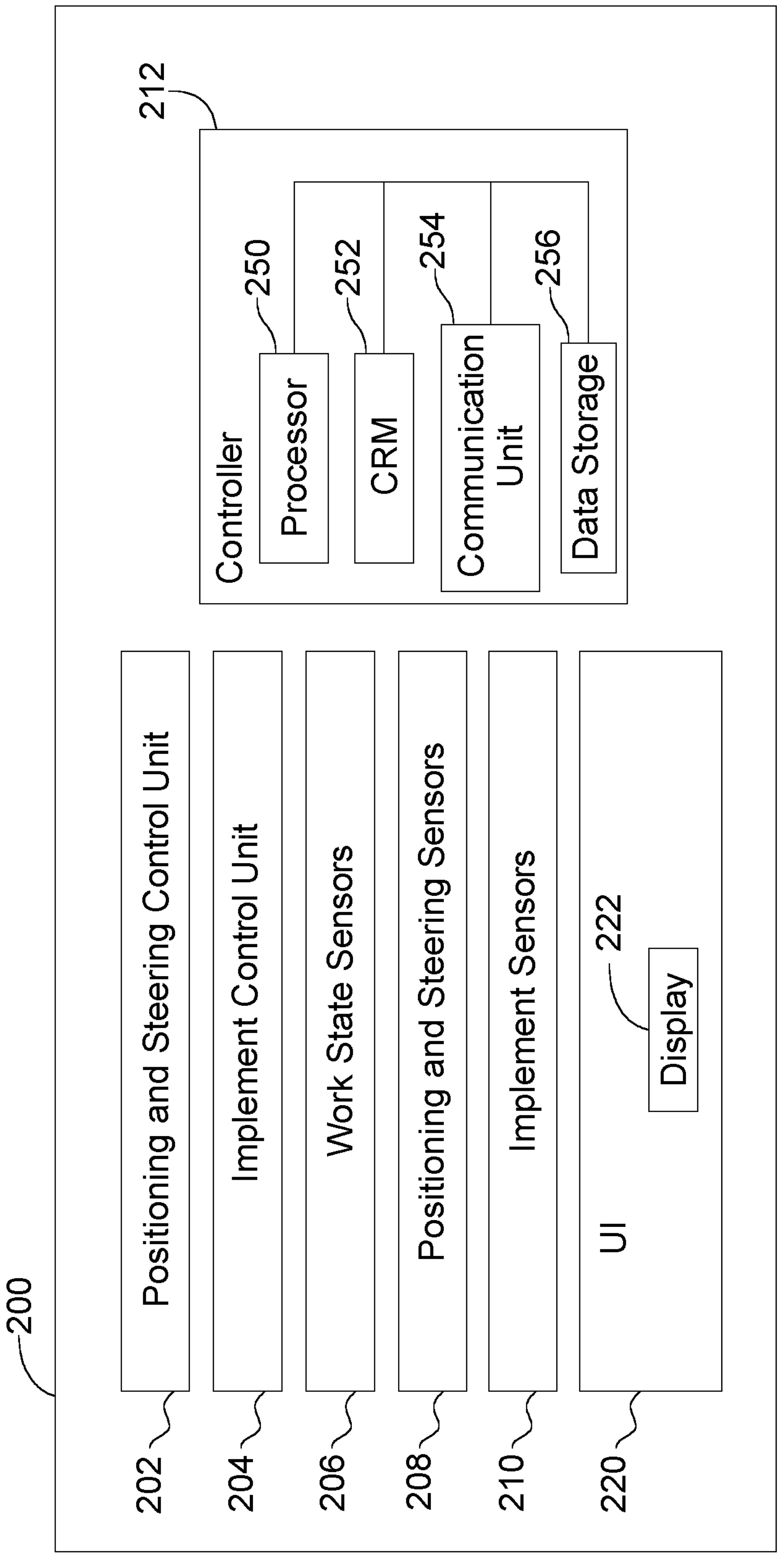
FIG. 2 is a block diagram representing a control system for the earth working machine according to an embodiment of the present disclosure.

Further by reference to FIG. 2, an exemplary control system 200 for the earth working machine 100 may include a single controller 212 or discrete controllers for each of the implement 110 and the work vehicle 102. The work vehicle 102 of the earth working machine 100, whether drawing or otherwise integrating the implement 110, may include an operator cab within which the control system 200 or at least certain components thereof may be disposed, including for example one or more interface devices 220 located proximal to an operator seat and configured to generate control signals and/or present displays (via display unit 222) associated with operation of the earth working machine 100. In one example, the interface device 220 may be used to receive user inputs regarding and further generally, or selectively, display information regarding operation of the work vehicle 102 and/or of the implement 110. Display information regarding operation of the work vehicle 102 and/or of the implement 110 to the display unit 222 based upon inputs from one or more of a positioning and steering control unit 202, an implement control unit 204, work state sensors 206, positioning and steering sensors 208, implement sensors 210, and other control units and sensors as may be appropriate and otherwise contemplated by one of skill in the art.

Although the various control units 202, 204 and sensors 206, 208, 210 are discretely indicated on FIG. 2 and may be described separately in the context of various functions herein, the control units and sensors may in many instances overlap in function such that the same component is provided in more than one of the represented modules, or two or more of the represented modules may for example have identical functionality.

An advance speed of the earth working machine 100 may for example be displayed on the display unit 222 associated with a user interface 220, along with other information such as the gear of the transmission, the weight of the material 180 (payload) being hauled by the earth working machine 100 and within the loading container 140, the state of loading container actuators 175 or other components such as the ejector body or the ejector (e.g., fully retracted, extending, fully extended, retracting) as indicated by signals from associated sensors. The display unit 222 may also be interactive and enable an operator of the earth working machine 100 to edit settings or parameters associated with the earth working machine through buttons, a touchscreen, or peripherals in communication with the user interface 220.

In accordance with a current work plan for the earth working machine 100 as further described below, the display unit 222 may also for example display or otherwise visually represent a current position of the earth working machine 100, past or planned routes for the earth working machine 100, a current profile 322 for the ground surface 125, and/or a target profile 324 for the ground surface 125. A cut-fill map corresponding to the current profile 322 and the target profile 324 may for example be provided by a site planning or work planning file or program which indicates a target topography of the area in which the earth working machine 100 is operating. As a simple example, it may display a large level topography for a site where a building foundation is to be poured, even though the current topography of the site is hilly or otherwise uneven. As another example, it may display a complex topography for a site which includes roads, hills, slopes, ditches, and other three-dimensional features.

The operator may control the earth working machine 100 through a combination of user interface 220 tools located inside the operator station, such as throttle and brake pedals and a lever which may be actuated to control components of the implement 110 such as via the implement control unit 204, wherein for example (in the context of an ejector system) an actuation position of the lever may control the speed at which the ejector moves. Actuation of the lever in a first direction may cause the ejector to move rearwards and unload material 180 from the loading container 140, while actuation of the lever in a second direction may cause the ejector to move forwards and prepare the loading container 140 to receive another load of material 180.

The implement control unit 204 may also enable operator control of the unloading of material 180 from the loading container 140 through a switch such as a button positioned on the lever, a detent of the lever, or an alternative user input elsewhere in the operator station. When the operator actuates the switch, it may activate an automated or semi-automated ejection mode for the earth working machine 100 in which the ejector unloads the material 180 in the loading container 140. Optionally, this automated ejection mode may include returning the ejector to its forward position at the end of the cycle so the earth working machine 100 is prepared to accept another load of material 180 in the loading container 140.

The implement sensors 210 of the control system 200 may in an embodiment include a volume sensing and/or payload weighing unit, for example coupled to the loading container 140 of the implement 110. The payload weighing unit may generate payload data or equivalent output signals based on a payload in the loading container 140. The payload data may for example be derived from a volume sensor, which may for example be included in the work state sensor unit 206. The volume sensor may identify one or more of a volume and a fill level of the payload in the loading container 140 of the implement 110.

Exemplary volume sensors in a volume sensing unit may include one or more of an infrared camera, a stereoscopic camera, a PMD camera, or the like. One of skill in the art may appreciate that high resolution light detection and ranging (LiDAR) scanners, radar detectors, laser scanners, and the like may be implemented as time-of-flight volumetric sensors within the scope of the present disclosure.

The position and size of an image region recorded by, e.g., a respective camera as a volume sensor in a volume sensing unit may depend on the arrangement and orientation of the camera and the camera lens system, in particular the focal length of the lens of the camera, but may desirably be configured to capture substantially the entire loading container 140 throughout a loading operation. One of skill in the art may further appreciate that image data processing functions may be performed discretely at a given image data source if properly configured, but also or otherwise may generally include at least some image data processing by the controller 212 or other downstream data processor. For example, conventional image and/or time-of-flight imaging data from any one or more image data sources may be provided for three-dimensional point cloud generation, image segmentation, object delineation and classification, and the like, using data processing tools as are known in the art in combination with the objectives disclosed.

The payload data received may indicate if a maximum fill level is achieved. Alternatively, or in addition, the payload data may be derived from a weight sensor (i.e., indirectly monitoring the payload). The weight sensor may for example identify one or more of weight or pressure of the payload in the loading container 140 of the implement 110. For example, in one embodiment of a weight sensor, loading container actuators 175 to tip the loading container 140 for dumping may be equipped with pressure sensors configured to sense hydraulic pressures of fluid within one or more different chambers of the loading container actuators 175 (e.g., a pressure sensor disposed within or otherwise fluidly connected to each pressure chamber of the loading container actuators) and to generate corresponding signals. The signal generated by such pressure sensors may be indicative of forces acting on the loading container 140. That is, the forces generated by weight of material from the payload captured within the loading container 140 may create a signal directed to the controller 212.

The positioning and steering control unit 202 and/or positioning and steering sensor unit 208 provided on the earth working machine 100 may include a GNSS receiver system which determines its position and communicates that position to controllers or monitors throughout the earth working machine 100. In other embodiments, the method or type of positioning system utilized may vary, and may include positioning systems utilizing one or more of satellite, cellular, or local positioning signals, or inertial sensors, and these systems may directly determine position or communicate with another system which determines position.

An exemplary but non-limiting list of possible work state sensors 206 associated with the earth working machine 100 may include one or more sensors configured to generate output signals representing a wheel speed, wheel slip, engine load, draft load, position (e.g., location, elevation), such as may be determined using a global positioning system (GPS) transceiver, and the like.

An exemplary but non-limiting list of possible implement sensors 210 may include one or more sensors configured to generate output signals representing an absolute blade height (e.g., using GPS), a relative blade height (e.g., using hydraulic cylinder-mounted sensors or an equivalent), gate position, engine load, draft load, fill level (e.g., using a stereo camera, profile scanner, or the like), etc.

Generally speaking, the controller 212 may be in communication with any or all of the electro-hydraulic valve, engine, transmission, user interface 220, positioning and steering control unit 202, an implement control unit 204, work state sensors 206, positioning and steering sensors 208, implement sensors 210, and display unit 222, along with various other sensors and tools as may otherwise be described herein but not shown in the figures. The controller 212 may for example receive signals indicative of parameters of the engine of the work vehicle 102, such as those relating to rotational speed (speed), torque, and power, and may control certain aspects of the operation of the engine, such as rotational speed, torque, and power. The controller 212 may communicate with the engine through intermediate components, such as an engine control unit (ECU), and thus may control the engine indirectly by sending commands to the ECU, which in turn controls the engine. Similarly, the controller 212 may receive signals indicative of rotational speed, gear or speed ratio, torque, and power of the transmission, and may control those some aspects of the operation of the transmission, including through an intermediate component such as a transmission control unit (TCU). While the controller 212 is described above as communicating with the various control units 202, 204, in various embodiments such units may be integrated into a common control unit while providing substantially the same end functionality.

The controller 212 further includes or may be associated with a processor 250, a computer readable medium 252, and data storage 256 such as for example a database network. It is understood that the controller 212 described herein may be a single controller having some or all of the described functionality, or it may include multiple controllers wherein some or all of the described functionality is distributed among the multiple controllers.

Various operations, steps or algorithms as described in connection with the controller 212 can be embodied directly in hardware, in a computer program product such as a software module executed by the processor 250, or in a combination of the two. The computer program product can reside in RAM memory, flash memory, ROM memory, EPROM memory, EEPROM memory, registers, hard disk, a removable disk, or any other form of computer-readable medium 252 known in the art. An exemplary computer-readable medium 252 can be coupled to the processor 250 such that the processor 250 can read information from, and write information to, the memory/storage medium 252. In the alternative, the medium 252 can be integral to the processor 250. The processor 250 and the medium 252 can reside in an application specific integrated circuit (ASIC). The ASIC can reside in a user terminal. In the alternative, the processor 250 and the medium 252 can reside as discrete components in a user terminal.

The term "processor" 250 as used herein may refer to at least general-purpose or specific-purpose processing devices and/or logic as may be understood by one of skill in the art, including but not limited to a microprocessor, a microcontroller, a state machine, and the like. A processor 250 can also be implemented as a combination of computing devices, e.g., a combination of a DSP and a microprocessor, a plurality of microprocessors, one or more microprocessors in conjunction with a DSP core, or any other such configuration.

The communication unit 254 may support or provide communications between the controller 212 and external communications units, systems, or devices, and/or support or provide communication interface with respect to internal components of the earth working machine 100. The communications unit may include wireless communication system components (e.g., via cellular modem, WiFi, Bluetooth or the like) and/or may include one or more wired communications terminals such as universal serial bus ports.

The data storage 256 as further described below may, unless otherwise stated, generally encompass hardware such as volatile or non-volatile storage devices, drives, electronic memory, and optical or other storage media, as well as in certain embodiments one or more databases residing thereon.

The controller 212 may also communicate with another controller located on the earth working machine 100 or through a cellular or satellite communication unit 254 to a computing device or network located remotely, such as a server or a device operated by a remote operator, system administrator, fleet manager, or the like. Communication with such controllers may be utilized to obtain remotely provided design plans to the controller 212, download remotely generated work plans to the controller 212, set certain parameters of the controller 212, or for the controller 212 to report out parameters of the operation of the earth working machine 100, such as the payloads hauled, the route taken, the areas which received unloaded material, etc. For example, in various embodiments as disclosed herein it may not be necessary (or even desired) that the controller 212 for any particular earth working machine 100 generates its own work plan for a given work area, or even obtains the design plan for the work area and from which the work plan is generated. Instead, the work plan generation as described further below may desirably in such embodiments be performed at a remote computing environment such as for example a cloud server, wherein the work plans are downloaded to the respective earth working machines 100 upon request, to initiate a specified working operation, etc.

Figure 3:
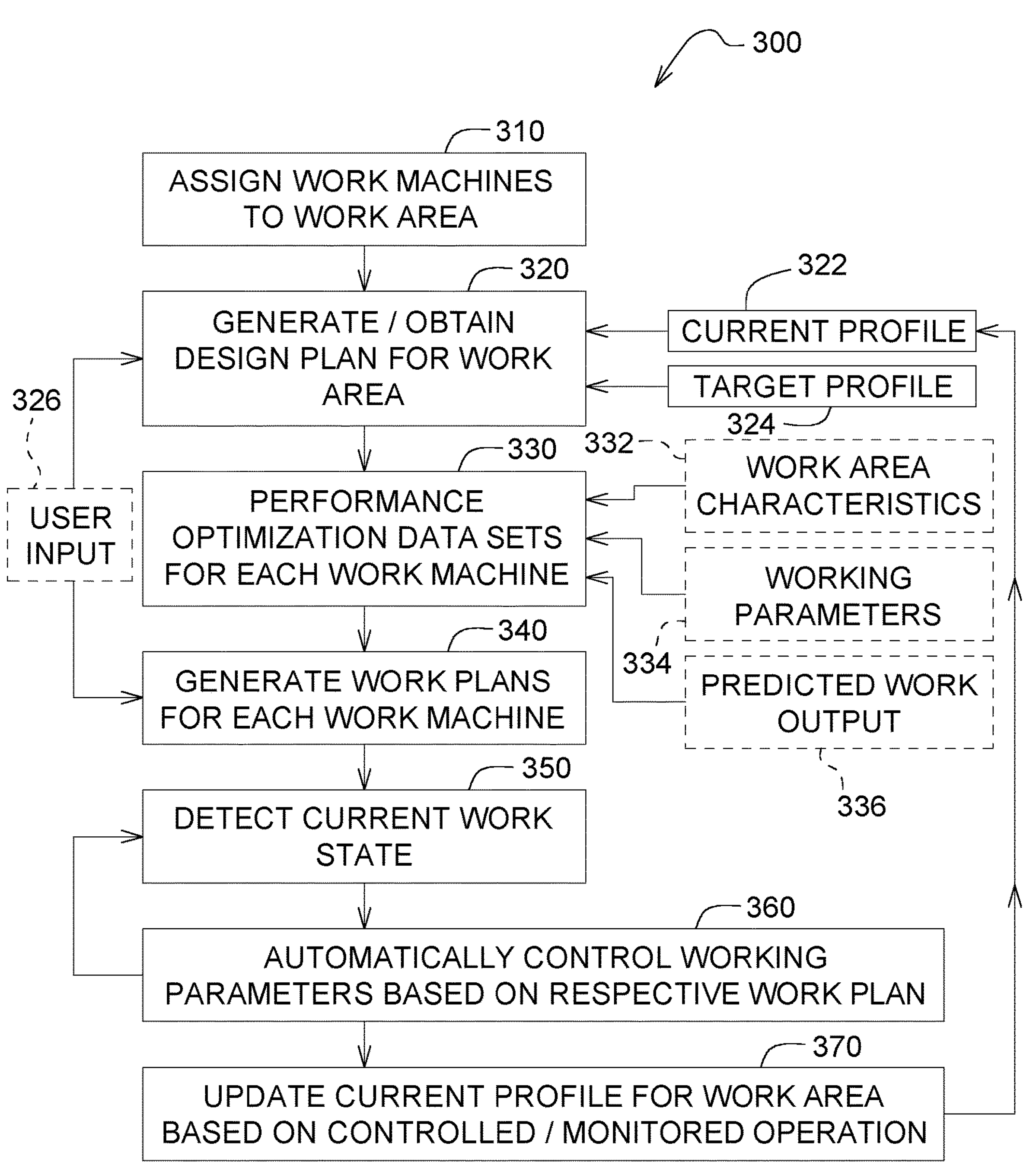
FIG. 3 is a flowchart representing an exemplary method according to an embodiment of the present disclosure.

Referring next to FIG. 3, with further illustrative reference back to FIGS. 1 and 2, an embodiment of a method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously. Unless otherwise specifically noted, operations, steps, functions, processes, and the like as disclosed in association with the method 300 may be executed or directed by a single computing device, or via multiple computing devices in operable communication via a communications network. Exemplary such computing devices may include onboard controllers 212 or machine control systems 200, remote (e.g., cloud) servers, mobile user devices, and the like.

The method 300 may begin in step 310 with the assignment of one or more earth working machines to a defined work area, and further in step 320 by generating or otherwise obtaining a design plan for the work area. The one or more earth working machines 100 may for example be manually assigned to a work area via user input from a central or remote administrator, or in some embodiments earth working machines 100 may be automatically identified and assigned to a work area based on the earth working machines 100 that are physically present in the work area at a given time, and further determined to be available and not already assigned to another work area.

As previously noted, the design plan may take the form of or otherwise comprise a cut and fill map as is known in the art, and may be obtained in a previously generated form or generated as needed for the work area. The design plan may be generated from or otherwise reference a difference between a current profile 322 associated with the work area and a target profile 324 associated with the work area. The design plan may further be selected or otherwise generated based in part on user input 326, provided via user interface 220 for a earth working machine 100 assigned to the area, or via a user interface for a central computing device functionally linked to the earth working machines 100. In an embodiment, the design plan may account for a locally performed survey of the work area, or a portion thereof, to define the current profile 322 and further account for remote or central generation of a target profile 324 for the work area or the surveyed portion thereof. The locally performed survey may be performed to initiate a current working operation, or may be based on a previous and stored survey.

The method 300 may continue in step 330 by generating or otherwise obtaining performance optimization data sets, preferably for each of the earth working machines 100 assigned to the work area, or for each of a subset of the earth working machines 100 for which work plans will be generated. The performance optimization data sets may for example account for some or all of work area characteristics 332, working parameters 334, predicted work outputs 336 for the earth working machines relative to the work area, and the like.

Exemplary work area characteristics 332 may include without limitation current weather conditions, material properties of the terrain being worked, an amount of time available for a working operation within the work area, and the like.

Exemplary working parameters 334 may include any number of values as one of skill in the art may understand as corresponding to a working operation that can be sensed and obtained in real time as input data from the earth working machine, and may further include values which are characteristics of the specific earth working machine 100. Such characteristics may be substantially static, such as for example a loading capacity of the loading container 140 of the implement 110, or may include a loading rate of the earth working machine 100 which may for example be dynamic as correlated to respective combinations of input data for sensed working parameters.

In an embodiment, the work plan generation step 340 may monitor certain characteristics of the earth working machine 100 which are substantially static, and make adjustments over time to the work plan to account for detected changes. As one example, the loading capacity of the loading container 140 for a particular implement 110 may be initially specified, based for example on physical dimensions of the loading container 140 that may be specified for the type of implement 110. However, the loading capacity of the loading container 140 may practically require adjustment if the earth working machine 100 is required to travel above certain advance speeds, particularly when loaded and when considering the environment of the travel surface. Further, the loading capacity of the loading container 140 may practically require adjustment as carryback material 180 is retained within the loading container 140 after unloading. In an embodiment, such adjustments to the corresponding characteristics of the earth working machine 100 may be automatically accounted for, or may trigger a prompt to an operator or other appropriate user before taking further action.

In an embodiment, with suitably selected working parameters 334 of the earth working machine 100, the achievable work output of the earth working machine 100 may be defined substantially by the work area characteristics 332. If the work area characteristics 332 are known, and the working parameters 334 are continuously monitored and/or controlled, it is thus possible to calculate a work output being achieved thereby and to arrive at a reasonable prediction of the achievable work output 336. If the work output is known or reasonably estimated, exact planning of further pending tasks within the work area or even analogous work areas can be accomplished.

For example, a sequence of different work segments within a work area, by a single earth working machine 100 or split up among a plurality of earth working machines 100, can be optimally specified for the respective work plans by reference to or otherwise corresponding to a predicted amount of earth worked during a relevant work state (e.g., digging), and further in view of a desired loading rate and the working parameters required for the respective earth working machine 100 to provide such a loading rate.

The generated work plan may further account for a specified unloading site for the earth working machines 100, and associated transport times between each of the sequence of work segments and the unloading site. In an embodiment wherein for example the work area includes a number of sites wherein material is to be removed (cut) and also a number of sites wherein material is to be added (filled), the work plan generation step 340 may preferably arrange sequences of work segments (e.g., including specified routes of advance and/or direction) for the one or more work machines 100 to optimize transitions between the respective work states based at least in part on optimized transport times there between.

Optimization may for example be accomplished regarding a required working time and/or the required number of earth working machines or other resources, all of which typically in consideration of at least the design plan and more particularly the target profile 324 for the work area.

The method 300 thus potentially enables optimum operation of one or more earth working machines 100 with regard to their respective work outputs and in certain embodiments the resources needed in order to operate them. Total costs, particularly for carrying out several successive work plans, can thereby be appreciably reduced.

The method 300 may accordingly continue in step 340 by generating work plans for some or all of the earth working machines 100 assigned to the work area. The work plans may in various embodiments be customized for earth working machines based for example on distinctions between their respective performance optimization data sets, further in consideration of the design plan for the work area. Customized work plans may include specified routes of advance (e.g., including directions of travel), a work cycle including specified work states and transitions there between, working parameters and/or work outputs for one or more of the work states, an amount of time to be spent in one or more of the work states, and the like.

In an embodiment, a work plan may be automatically generated, for example by a remote server application, and then manually confirmed by a system administrator, local or remote machine operator, supervisor, or the like. A work plan may in an embodiment be modified in real time by one or more of the above-referenced users as needed.

With at least one earth working machine 100 having a work plan assigned thereto, the method 300 may continue in step 350 by detecting a current work state for at least the earth working machines 100 to be monitored, and/or autonomously and/or remotely controlled in view of the respectively assigned work plans. Respective work states may be detected based on a predetermined sequence of work states within a work cycle corresponding to the work plan for the earth working machine 100, based at least in part on input data for the working parameters 334 thereof. In an embodiment, each individual work state corresponding to the defined work cycle may for example have one or more aspects by which the respective work state is automatically identifiable.

In an embodiment, some or all of such aspects may be predetermined. In some embodiments at least some of such aspects are determined, for example as part of the work plan generation step 340, using a work state model which is developed over time based on input data sets from various earth working machine sensors 206, 208, 210, further as correlated with defined work states for the work cycle at issue. The correlations may include user input 326 during the training stage, to provide or otherwise confirm a work state as corresponding to the input data sets.

In an embodiment, development of a work state model may encompass the classifying of sequences of data recorded by sensors 206, 208, 210 into defined machine states, which may for example relate to a particular type of earth working machine 100, work cycle, or the like. Work state estimation may be treated a classical sequence classification problem, addressed in an embodiment as disclosed herein by building supervised Machine Learning (ML)/Deep Learning (DL) classification algorithms like Logistic Regression and Long Short-Term Memory (LSTM) recurrent neural network models for sequence classification. The LSTM models are capable of learning from internal representations of the time series data, effectively remembering over long sequences of input data and previous operation of the earth working machine 100. The LSTM models may accordingly be trained on time series data and observe loss and accuracy values over N training iterations, wherein losses are decreased and accuracy increased over time. The model may be described as classifying these time series data into defined work states.

For generation of the wear state model, time series data may for example be streamed from the respective sensors/data sources 206, 208, 210, 220 on a earth working machine 100 (or a plurality of analogous earth working machines) via a communications network onto a cloud server, wherein the model is developed (i.e., trained and validated) at the cloud server level. Once the model has been sufficiently validated, it may be transmitted, for example via the communications network, and deployed by the controller 212 onboard an earth working machine 100 for subsequent work state estimation as described below. The cloud server may however continue to receive input time series data from the earth working machine 100 (or plurality of analogous earth working machines) for the purpose of further refining the model, wherein updated versions of the model may be transmitted to the earth working machine 100 periodically or on demand.

With work state models having been developed and selectively retrievable by the controller 212 for a new iteration of a working operation by the earth working machine 100, the step 350 of work state detection may include receiving input data for current working parameters 334 associated with the earth working machine 100, e.g., the work vehicle 102 and/or implement 110 from sensors 206, 208, 210, and optionally input data from the user interface 220. The step 350 further may include automatically determining the current work state, and/or transitions between work states, for example based on the stored correlations between the input data sets and the various work states by selective retrieval and implementation of the work state models.

In some contexts a work cycle according to the work plan for the earth working machine 100 may include four work states as represented below in illustrative form with respect to FIG. 4, whereas in other contexts a work cycle that is otherwise equivalent may include six work states such as idle states to account for periods of time in which the earth working machine 100 requires maintenance, must wait for other earth working machines in the area to complete a respective working operation, and the like.

As further described below, in some embodiments a work state transition from a given work state may be defined according to an assigned work plan with respect to the traverse of threshold values for one or more respective parameters. For example, a work plan for a given earth working machine 100 as previously noted may specify that a work state transition is triggered when the loading container 140 of the earth working machine 100 is loaded above and/or unloaded below a threshold amount. Such thresholds may be predetermined based for example on a configuration of the loading container 140, or may be dynamic in nature, such as for example adjusted in view of machine performance, detected carryback material, or as specified by user input via the user interface 220 to the control system 200 as part of the work plan generation step 340 even during a working operation. In an embodiment, such thresholds may themselves be dynamically determined by the control system 200 as values that are learned over a number of work cycles as best corresponding to respective work states or transitions between certain work states. For example, the control system 200 may recognize in the context of a particular working operation that a certain fill level best corresponds with a point at which the operator stops the cutting mode and transitions to a traveling mode, and apply that fill level as a threshold value when work state transitions are automatically to be detected and implemented.

In addition, or in the alternative, a work state transition may be triggered when a particular operation is identified based on one or more monitored parameters or rates of change thereof. As one example, a positive volumetric flow rate of material into the loading container 140 may be indicative of a loading work state, whereas a negative volumetric flow rate of material into the loading container 140 may be indicative of an unloading work state, either of which may for example be independent of any specific thresholds.

As another example, a work state transition may be detected when the earth working machine 100 crosses a geographic boundary or otherwise enters a particular location as may be specified according to the work plan. Such thresholds may also be dynamic in nature, for example applied during the work plan generation step 340 as values that are learned over a number of work cycles as best corresponding to respective work states or transitions between certain work states.

The method 300 may further in step 360 include generating output signals, for example from the controller 212 or associated control units 202, 204 in control system 200, to automatically control one or more working parameters for the earth working machine 100 according to the assigned work plan and further for example based on current working parameters 334, work area characteristics 332, and the detected current work state and/or work state transition.

In cases where autonomous control is not available or otherwise selected for a given earth working machine 100, the method 300 may include generating output signals for example to indicate whether the earth working machine 100 is performing in accordance with the assigned work plan, or to indicate that an intervention by the operator is required or imminent such as for work state transitions, etc.

As the earth working machine 100 cuts and/or fills the terrain in the work area, the method 300 may further include in step 370 continuously monitoring operation of the earth working machine and updating the current profile 322 to for example account for the corresponding work output and changes in the profile. The updates to the current profile 322 may in various embodiments be selectively provided as feedback to one or more other earth working machines 100 assigned to the work area, and/or to a central server or other computing device responsible for updating the design plan, corresponding work plans for the earth working machines 100, and the like.

In an embodiment, the feedback relating to the current profile 322 may be provided not only to other earth working machines 100 of similar type such as for example scraper units, and to a cloud server or the like for adaptive generation of work plans for such earth working machines 100 as they continue to operate in the work area, but also to earth working machines of a different type that are assigned to the same work area. For example, feedback regarding work output in the work area and corresponding changes in the current profile as the scrapers cut away material from the ground surface may be relevant to other earth working machines such as graders, dozers, excavators, and the like, and which may themselves further receive customized work plans from a cloud server according to the same method 300.

Figure 4:
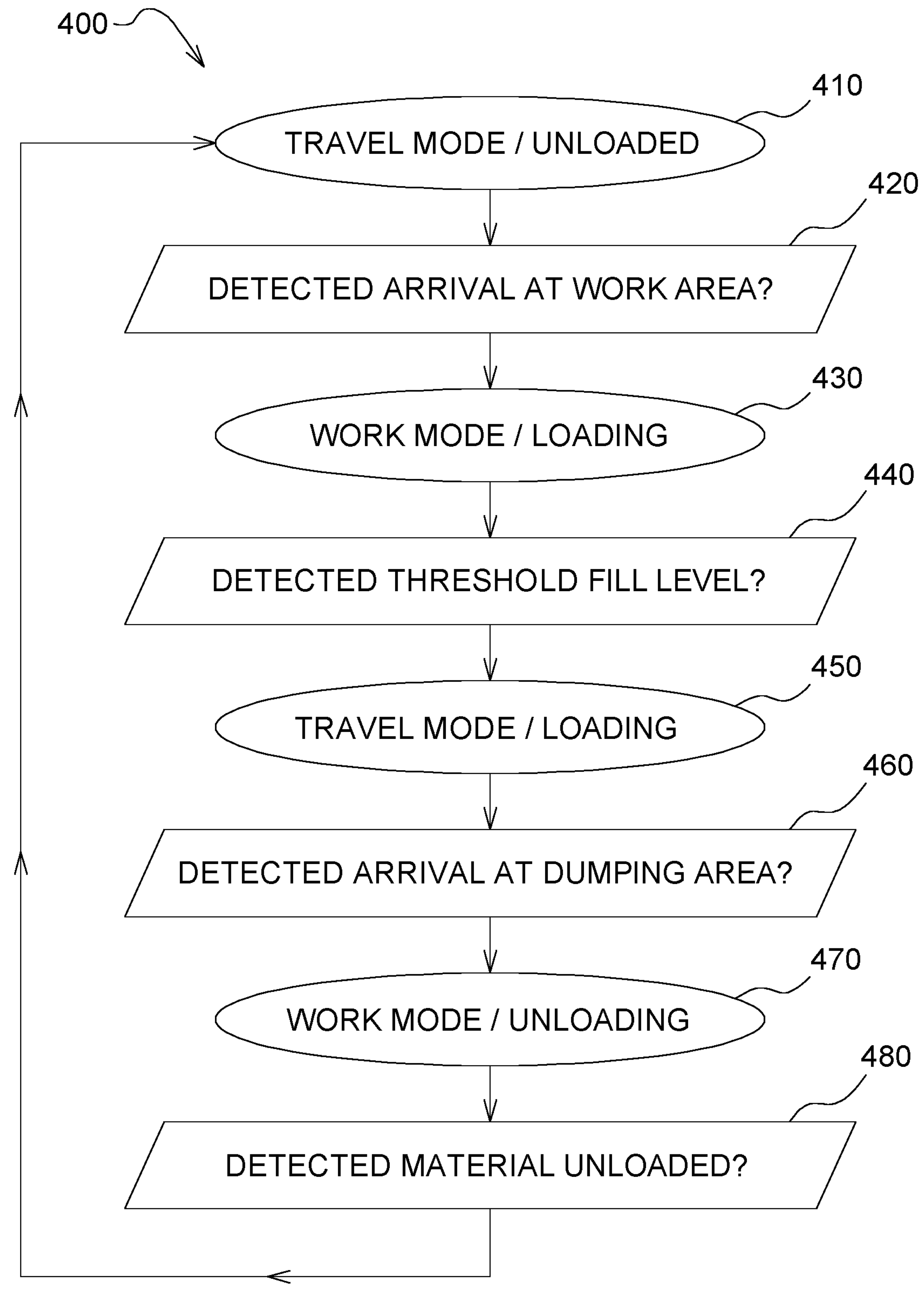
FIG. 4 is a flowchart representing an exemplary work cycle and corresponding work states according to an embodiment of the present disclosure.

Referring to FIG. 4, a work cycle 400 according to an exemplary work plan assigned to an earth working machine 100 including a scraper as the implement 110, and an associated workflow for ascertaining work states, may be described for illustration, but without limitation on the scope of the present disclosure unless otherwise specifically noted.

An initial work state 410, which is of course only first for illustrative purposes, includes a travel mode for the earth working machine 100, and more particularly for the work vehicle 102 or work vehicle portion of the earth working machine 100, further wherein the implement 110 of the earth working machine 100 is unloaded. In such an event, the controller 212 may be configured, for example according to the assigned work plan, to set one or more target working parameters such as a transmission gear and/or advance speed of the earth working machine 100 for a smooth ride when transporting an empty loading container 140 as opposed to the situation where the implement 110 is fully loaded. The controller 212 may further, in view of target loading areas associated with the work cycle and/or a number of other earth working machines 100 assigned to the same work area generally, automate or otherwise regulate one or more aspects of earth working machine travel so as to arrive at the next loading area at an appropriate time as specified in the assigned work plan.

Upon determining (step 420) that the earth working machine 100 has arrived at the work area, or in various embodiments at a designated portion of the work area, as specified in the work plan and further based on any relevant combination of monitored input data from sensors 206, 208, 210, such as for example GPS-determined locations and in some cases further or alternatively from the user interface 220, the controller 212 may note a transition from the first work state 410 to a second work state 430 including a work-loading (cutting) mode. In this second work state 430, the implement 110 and more particularly the blade 115 and the cutting edge 120 thereof may be actuated to engage the ground surface 125 and cause loading of the material 180 into the loading container 140, while an advance speed and other operations of the work vehicle are controlled appropriately and in accordance with the loading operation.

As noted elsewhere herein, the transition determined in step 420 from the first work state 410 to the second work state 430 may be based on a detected change in volumetric flow rate associated with the loading operation, or more proactively based on a detected location of the earth working machine 100 relative to a specified loading (cutting) zone in the work area, or various additional or alternative examples as may be apparent to one of skill in the art.

Implement sensors 210 for example associated with a volume sensing and/or payload weighing unit may be utilized (step 440) to determine a transition from the second work state 430, such as for example when the scraper fill level is determined to be above a certain threshold. The threshold may as noted above be substantially static and fully dependent on the parameters of the loading container 140, or may otherwise be variable and at least partially dependent on the above-referenced work cycle parameters, wherein for example one or more earth working machines 100 are assigned to a given work area and the number of earth working machine loads is optimized in some fashion rather than simply assigning a full load for each work cycle iteration. For example, it may be determined that a particular earth working machine 100 is capable of carrying a payload of a first size, but that based on an amount of time allocated for a working operation and/or a number of earth working machines 100 assigned to the working operation it is preferred for the earth working machine 100 to carry a specified payload smaller than the capabilities of the earth working machine 100 would otherwise permit, as may be specified in the assigned work plan.

Upon determining a transition from the second work state 430 to a third (e.g., travel-loaded) work state 450, the earth working machine 100 may next be configured for transport of the loaded material 180 in the loading container 140 to a specified dumping area. The controller 212 may for example be configured to set one or more target parameters such as a transmission gear and/or advance speed of the earth working machine 100 for a travel mode that is different from the "unloaded" travel mode in view of the loaded material 180.

The controller 212 may further, in view of target dumping areas associated with the work cycle and/or a number of other earth working machines 100 assigned to the same work and/or dumping area generally, automate or otherwise regulate one or more aspects of earth working machine travel so as to arrive at the next dumping area at an appropriate time or in an appropriate position relative to any other earth working machines 100.

Upon determining (step 460) that the earth working machine 100 has arrived at the specified or at least an approved dumping area, based on any relevant combination of input data from sensors 206, 208, 210, such as for example GPS-determined locations and in some cases further or alternatively from the user interface 220, the controller 212 may note or otherwise execute actions corresponding to a transition from the third work state 450 to a fourth work state 470 including a work-unloading (dumping) mode. In this fourth work state 470, the loading container actuators 175 (or an ejector system as alternatively described above) may be utilized to cause unloading of the material 180 from the loading container 140, while an advance speed and other operations of the work vehicle are controlled appropriately and in accordance with the unloading operation. As previously noted, depending on the configuration of the implement 110 and loading container 140, the loading container 140 may be pivoted upward to cause the material 180 to fall out of the loading container 140, optionally with the assistance of one or more controlled components thereof, or an ejector may be actuated to laterally slide the material 180 out of the earth working machine 100.

As noted elsewhere herein, the transition determined in step 460 from the third work state 450 to the fourth work state 470 may be based on a detected change in volumetric flow rate (e.g., negative flow rate) associated with the loading operation, or more proactively based on a detected location of the earth working machine 100 relative to a specified unloading (filling) zone in the work area, or various additional or alternative examples as may be apparent to one of skill in the art.

The controller 212 may further, in view of target unloading rates associated with the work cycle and/or a number of other earth working machines 100 assigned to the same work and/or dumping area generally, automate or otherwise regulate one or more aspects of the implement control unit 204 so as to increase or decrease the unloading rate as needed or desired.

A process for detecting that the unloading mode is complete, i.e., a transition or trigger for transitioning from the fourth work state, may for example include processing of inputs from sensors in the hydraulic cylinders, ejector system, or other elements of a implement control unit 204 respective to the type of earth working machine 100, processing of inputs from sensors or image data sources capturing a pose of the loading container 140, or the like. In an embodiment, the control system 200 may further be configured to determine one or more characteristics (e.g., an amount and/or location) of "carryback" material 180 still remaining in the loading container 140, either adhering to bottom and/or side surfaces of the loading container 140 or otherwise adhering to elements of the implement control unit 204 such as an ejector blade. The implement 110 may for example be considered as "unloaded" if an amount of carryback material is detected below a defined threshold, whereas the control system 200 may otherwise suspend transition from the unloading work state/mode and alert or otherwise initiate an intervention for further removal of material 180 from the loading container 140. Rather than relying on a defined threshold, the system 200 may monitor a trend of carryback material 180 accumulation over time based on a calculated aggregation of data inputs from one unloading iteration to the next. Aggregation trends may be calculated and accordingly utilized to provide non-threshold-based determinations of whether an intervention is required, such as for example by enabling the prediction of future carryback material states.

In an embodiment, an amount of carryback material 180 may be determined using for example a first measurement corresponding to the loading container 140 in a completely empty state and a second measurement corresponding to the loading container 140 after an unloading stage is completed or otherwise upon detecting an unloaded state, wherein a difference between the first and second measurements may be categorized as a weight of the remaining carryback material 180. In another exemplary embodiment, an image data source (e.g., camera, lidar sensor, radar sensor) may be used to scan or otherwise capture data corresponding to a first profile of the loading container 140 in a completely empty state and to scan or otherwise capture data corresponding to a second profile of the loading container 140 after an unloading stage is completed or otherwise upon detecting an unloaded state, wherein a difference between the first and second profiles may be processed to determine a volume of the remaining carryback material. Other embodiments may include a combination of the above-referenced inputs, and/or a combination of inputs from sensors based on the earth working machine 100 and external to the earth working machine 100.

Finally, upon determining (step 480) that the previously loaded material 180 has been dumped or otherwise unloaded from the loading container 140 of the implement 110, the controller 212 may note or otherwise execute actions corresponding to a transition from the fourth work state 470 back to the first work state 410, wherein the earth working machine 100 travels unloaded to the cutting area as previously noted.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of controlling operation of one or more earth working machines each including a loading container and a scraper blade operatively coupled to the loading container, wherein each of the one or more earth working machines is configured in a first work state to control loading of earth being worked by the scraper blade while the machine is advancing into the loading container, wherein a flow rate of earth into the loading container is dependent on at least an advance speed of the working machine and an actuatable position of the scraper blade relative to a ground surface traversed by the working machine, in a second work state to disable further loading and to transport the earth working machine with the earth loaded in the loading container, and in a third work state to direct unloading of the loaded earth from the loading container, the method comprising:

obtaining a design plan corresponding to a working area to which the one or more earth working machines are assigned;

for each of the one or more earth working machines:

generating and/or selectively retrieving one or more performance optimization data sets comprising a loading capacity of the loading container and loading rates of the earth working machine correlated to respective combinations of input data for working parameters for the earth working machine;

predicting an amount of earth to be worked during one iteration of the first work state for the earth working machine based upon at least the one or more performance optimization data sets;

generating a work plan comprising a route of advance and corresponding work state transitions of the earth working machine with respect to the working area, wherein the work plan is generated based at least in part on the predicted amount of earth to be worked with each iteration of the first work state and the design plan and comprises a projected sequence of work cycles to optimize a number of iterations of the first work state required to produce a profile for the working area corresponding to a target profile of the working area, wherein each work cycle comprises a sequence of the first, second, and third work states, and wherein each iteration of the first work state for a given work cycle defines a respective work segment;

automatically controlling one or more working parameters for the earth working machine in accordance with the generated work plan;

obtaining current input data during operation of the earth working machine corresponding to the loading capacity and the loading rate thereof;

generating and/or selectively retrieving one or more updated performance optimization data sets based at least in part on the obtained current input data;

generating an updated work plan based at least in part on the one or more updated performance optimization data sets; and automatically controlling one or more working parameters for the earth working machine in accordance with the updated work plan.

2. The method of claim 1, wherein the design plan is generated from one or more data sets comprising first profile data associated with a current profile of the working area and second profile data associated with a target profile of the working area, wherein the first profile data and the second profile data respectively comprise x, y, and z coordinate data in a reference system external to the one or more earth working machines.

3. The method of claim 2, comprising updating the first profile data to account for a determined work output based at least in part on a sensed one or more working parameters for at least one of the one or more earth working machines at least upon transitioning from the first work state to the second work state.

4. The method of claim 3, wherein the updated first profile data are made selectively available for each of a plurality of earth working machines associated with the working area, wherein the plurality of earth working machines comprises the one or more earth working machines as a first set of earth working machines and at least one earth working machine of a different type as a second set of earth working machines.

5. The method of claim 4, further comprising updating respectively generated work plans for at least the first set of earth working machines based at least in part on the updated first profile data, and automatically controlling one or more working parameters for each of the at least first set of earth working machines in accordance with the respectively updated work plans.

6. The method of claim 1, wherein each of the plurality of work cycles are assigned to a respective one of a plurality of earth working machines associated with the working area.

7. The method of claim 1, wherein transport times between each of the plurality of work segments and an assigned unloading site are accounted for in the generated work plan.

8. The method of claim 1, wherein the performance optimization data sets for each of the one or more earth working machines further comprise data corresponding to one or more material characteristics of the earth to be worked by the respective earth working machine.

9. The method of claim 1, further comprising, for each of the one or more earth working machines:

determining an amount of carryback material remaining in the loading container after an unloading operation; and generating and/or selectively retrieving the one or more updated performance optimization data sets, and further generating the updated work plan, based at least in part on an adjusted loading capacity of the loading contained based at least in part on the determined amount of carryback material remaining in the loading container.

10. The method of claim 1, further for each of the one or more earth working machines comprising determining a current work state of the earth working machine based on sensed real-time values for one or more working parameters corresponding to an advance speed of the earth working machine, a position of the scraper blade, and a level and/or volume of earth loaded in the loading container.

11. The method of claim 1, wherein for each of the one or more earth working machines the automatically controlled one or more working parameters comprise one or more working parameters associated with a steering unit and/or scraper blade for the earth working machine.

12. The method of claim 1, wherein at least one variable associated with the work plan for at least one of the one or more earth working machines is adjustable in real time based on user input received via a user interface functionally linked to a controller for the at least one earth working machine.

13. A system comprising:

one or more earth working machines each including a loading container and a scraper blade, and being configured in a first work state to control loading of earth being worked by the scraper blade while the respective machine is advancing into the loading container, wherein a flow rate of earth into the loading container is dependent on at least an advance speed of the working machine and an actuatable position of the scraper blade relative to a ground surface traversed by the working machine, in a second work state to disable further loading and to transport the earth working machine with the earth loaded in the loading container, and in a third work state to disable advancing of the machine and further direct unloading of the loaded earth from the loading container;

a data storage network having stored therein:

a design plan comprising design data representing a difference between a current profile of a working area and a target profile of the working area, wherein the design data comprise x, y, and z coordinate data in a reference system external to the one or more earth working machines; and for at least one of the one or more earth working machines, one or more performance optimization data sets comprising a loading capacity of the loading container and loading rates of the earth working machine correlated to respective combinations of input data for working parameters for the earth working machine;

one or more computing devices in functional communication with the one or more earth working machines and with the data storage network, wherein the one or more computing devices are configured to, for each of the one or more earth working machines:

predict an amount of earth to be worked during one iteration of the first work state for the at least one earth working machine based upon at least the one or more performance optimization data sets;

generate a work plan comprising a route of advance and corresponding work state transitions of the earth working machine with respect to the working area, wherein the work plan is generated based at least in part on the predicted amount of earth to be worked with each iteration of the first work state and the design plan, and wherein the generated work plan comprises a projected sequence of work cycles to optimize a number of iterations of the first work state required to produce a profile for the working area corresponding to the target profile of the working area, wherein each work cycle comprises a sequence of the first, second, and third work states, and wherein each iteration of the first work state for a given work cycle defines a respective work segment;

automatically control one or more working parameters for the earth working machine in accordance with the generated work plan;

obtain current input data during operation of the earth working machine corresponding to the loading capacity and the loading rate thereof;

generate and/or selectively retrieve one or more updated performance optimization data sets based at least in part on the obtained current input data;

generate an updated work plan based at least in part on the one or more updated performance optimization data sets; and automatically control one or more working parameters for the earth working machine in accordance with the updated work plan.

14. The system of claim 13, wherein:

the design plan is generated from one or more data sets comprising first profile data associated with a current profile of the working area and second profile data associated with a target profile of the working area; and the one or more computing devices are configured to update the first profile data to account for a determined work output based at least in part on a sensed one or more working parameters for the at least one earth working machine at least upon transitioning from the first work state to the second work state.

15. The system of claim 14, wherein:

the updated first profile data are made selectively available for each of a plurality of earth working machines associated with the working area, the plurality of earth working machines comprises the one or more earth working machines as a first set of earth working machines and at least one earth working machine of a different type as a second set of earth working machines, and the one or more computing devices are configured to automatically control one or more working parameters for each of the plurality of earth working machines in accordance with respectively generated work plans, wherein the respectively generated work plans are based at least in part on the updated first profile data.

16. The system of claim 13, wherein each of the plurality of work cycles are assigned to a respective one of a plurality of earth working machines associated with the working area.

17. The system of claim 13, wherein transport times between each of the plurality of work segments and an assigned unloading site are accounted for in the generated work plan.

18. The system of claim 13, wherein the performance optimization data sets further comprise data corresponding to one or more material characteristics of the earth to be worked by the earth working machine.

19. The system of claim 13, wherein the one or more computing devices are configured to:

determine an amount of carryback material remaining in the loading container after an unloading operation; and generate and/or selectively retrieve the one or more updated performance optimization data sets, and further generating the updated work plan, based at least in part on an adjusted loading capacity of the loading contained based at least in part on the determined amount of carryback material remaining in the loading container.

* * * * *